Nov. 21, 1933.  W. L. WALSH  1,935,786
TIRE CHAIN
Filed Dec. 4, 1931
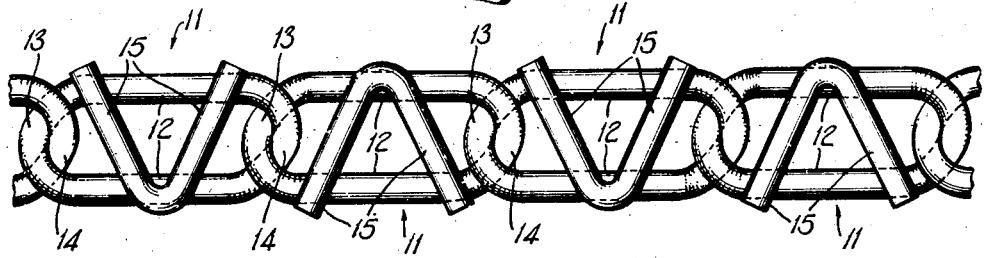
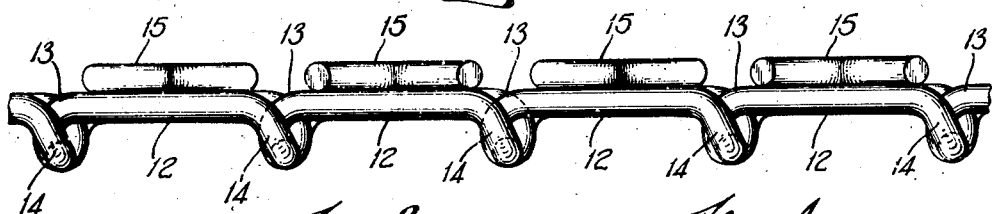
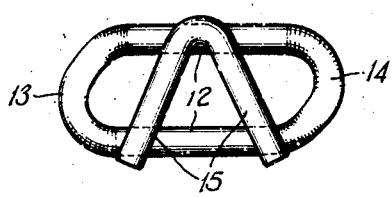
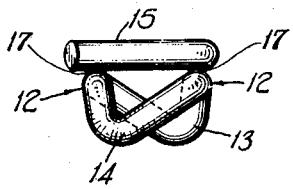
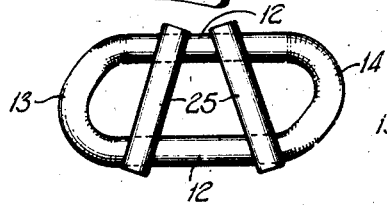
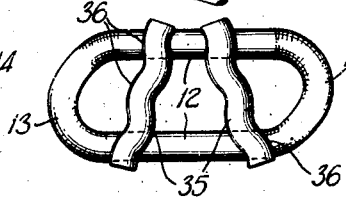
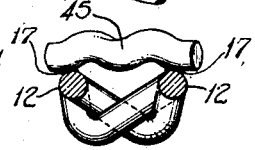
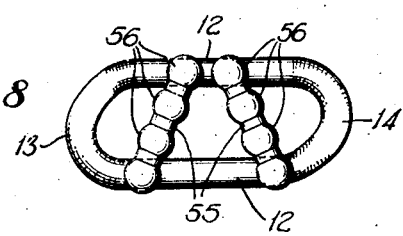
INVENTOR.
WILFRID L. WALSH
BY
ATTORNEY Patented Nov. 21, 1933

1,935,786

UNITED STATES PATENT OFFICE 1,935,786

TIRE CHAIN

Wilfrid L. Walsh, Stratford, Conn., assignor to American Chain Company, Inc., a corporation of New York Application December 4, 1931. Serial No. 578,899

4 Claims. (Cl. 152—14)

This invention relates to the fabrication of cross chains for anti-skid tire chains to be used on vehicle wheels, and has for its general object the provision of cross chains comprising open links provided with reinforcement bars bridging the openings in the links and so disposed as to afford improved resistance to sidewise skidding movements of the wheels and also adapted to enhance the tractive efficiency of the tire chain when its wheel is driven forward or backward and also to provide improved resistance to sliding movements of the wheels when the brakes are applied.

Another object of the invention is to provide the individual links of a cross chain each with a plurality of reinforcement bars so disposed in divergent relation to each other and to the longitudinal axis of the cross chain that the anti-skid and tractive effects secured are at all times balanced when considering either of the tire chains on the rear wheels of a vehicle, without the need for special construction of such tire chains with respect to their position as applied to the right or left wheels.

Still another object of the invention is to provide a form of open wire link for embodiment in such cross chains that the strands supporting the reinforcing bridge bars will occupy the same plane with each other and also to provide these wire links with integral end loops so offset from the plane occupied by the strands that each link will present toward the tire an arch-shaped contour adapted to conform snugly with the curved periphery of the tire.

The above and other features of the invention are illustrated and described fully in the accompanying drawing and specification and are pointed out in the claims.

In the drawing,

Fig. 1 is a plan view of part of a cross chain for anti-skid tire chain in which the invention has been embodied.

Fig. 2 is a view in side elevation of the cross chain shown in Fig. 1.

Fig. 3 is a detail view in plan of one of the links composing the chain shown in the preceding figures.

Fig. 4 is a detail view thereof in end elevation, looking from right to left on Fig. 3.

Figs. 5 to 8, inclusive, are views respectively similar to Fig. 3, showing modified forms of links embodying the invention.

In a now-preferred embodiment of the invention, illustrated in Figs. 1 to 4, inclusive, the parts designated respectively by the reference characters 11 are the individual links of a cross chain adapted for embodiment in anti-skid tire chain for a vehicle wheel, it being understood that such cross chains may be connected in any well-known manner with the side chains or other supporting parts of a tire chain of conventional or suitable structure, the latter being not illustrated herein, as it does not form an essential part of the present invention.

In the instance illustrated, each of the links 11 is formed of a piece of wire stock of any suitable material and cross section, the links illustrated being made of round steel wire bent to form side strands 12 spaced on each side of the longitudinal axis of the link and connected by end loops 13 and 14, which are oppositely twisted with relation to each other and to the longitudinal axis of the cross chain so that, when connected, all of the links will present similar faces toward that side of the cross chain which is to be exposed for contact with the road.

In the drawing, this is the upper side illustrated but it will be understood that this side will be presented outwardly and downwardly from the tire when in contact with the road.

In pursuance of an important object of the invention, each of the links 11 is provided, on the side just-mentioned, with a plurality of bridge bars or reinforcing members 15 extending across the central opening of the link and preferably disposed in divergent relation to each other, substantially as shown in Fig. 1, and having their convergent ends connected to form a V-shaped part with the apex of the V pointing transversely of the link's major axis, which coincides with the longitudinal axis of the cross chain in the instance illustrated.

I prefer to dispose these V-shaped parts on certain of the links in opposite directions to those on other links, and in Figs. 1 and 2 the V-shaped parts are alternately disposed in opposite directions on adjacent links.

In pursuance of another object of the invention, the side strands 12 lie in a single plane while the end loops 13 and 14 are respectively offset from said plane on the opposite side of the link, thus forming an arch-like structure adapted to conform snugly with the curved periphery of the tire when applied thereto.

The divergent bars are secured on their supporting strands in any suitable manner, and may desirably be united metallically thereto as by the welds indicated at 17. The divergent arrangement of the bars 15 secures a balanced anti-skidding effect for each of the cross chains composed of links thus reinforced, and for each tire chain, embodying such cross chains, so that any stock tire chain may be applied to either rear wheel of a car indiscriminately, making it unnecessary to provide right and left hand tire chains.

The same balanced effect may be secured by the use of separate bars as shown at 25 in Fig. 5, the supporting link being of similar structure to that shown and described with reference to Figs. 1 to 4, inclusive.

So also, instead of using straight bars, as in the forms of the preceding figures, use may be made of wire stock 35 having lateral bulges or waves, as illustrated at 36 in Fig. 6, or vertically corrugated wire stock, as illustrated at 45 in Fig. 7, whether the component bars be separately attached or connected at their convergent ends.

Wire stock 55 having substantially spheroidal enlargements 46 spaced along the bars, as illustrated in Fig. 8, may be utilized and, in general, such modifications of the stock employed may be made as will occur to those skilled in the art without departing from the spirit of the invention.

For example, the V-shaped reinforcement bars may be disposed with their apices all pointing in the same direction.

I claim:

1. An open link for a cross chain for anti-skid tire chain, said link having strands spaced on each side of the longitudinal axis of said link, and a plurality of road-engaging reinforcement bars bridging the central opening of said link in divergent relation and secured to said side strands at the same face thereof, said bars being connected together at their convergent ends to constitute a unitary V-shaped part.

2. An open link for a cross chain for anti-skid tire chain, said link having strands spaced on each side of the longitudinal axis of said link, and a plurality of road-engaging reinforcement bars bridging the central opening of said link in divergent relation and secured to said side strands at the same face thereof, said bars being connected together at their convergent ends to constitute a unitary V-shaped part having its apex disposed transversely of the link.

3. A cross chain for anti-skid tire chains, said cross chain comprising open links having strands spaced on each side of the longitudinal axis of said links and a plurality of road engaging reinforcement bars bridging in the central opening of each link in divergent relation and secured to said side strands at the same face thereof, said bars being connected together at their convergent ends to constitute a unitary V-shaped part disposed with its apex transversely of the cross chain.

4. A cross chain for anti-skid tire chains, said cross chain comprising open links having strands spaced on each side of the longitudinal axis of said links and a plurality of road engaging reinforcement bars bridging the central opening of each link in divergent relation and secured to said side strands at the same face thereof, said bars being connected together at their convergent ends to constitute a unitary V-shaped part disposed with its apex transversely of the cross chain, the apices of certain of said reinforcement parts extending in opposite directions relatively to each other.

WILFRID L. WALSH.